E. Y. DRAKE.
TOILET BOWL CLEANER.
APPLICATION FILED JUNE 7, 1919.
1,361,972.
Patented Dec. 14, 1920.
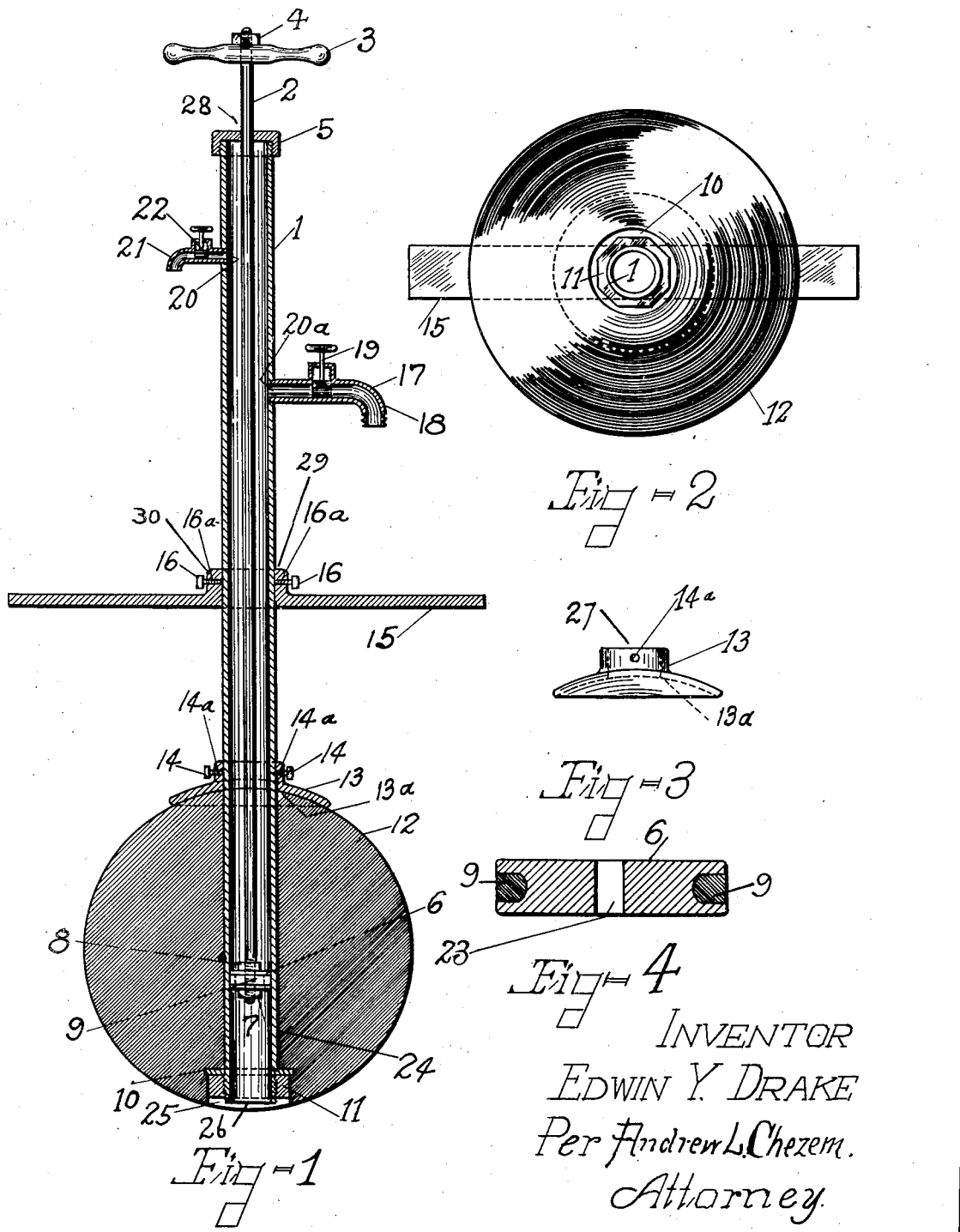
INVENTOR
EDWIN Y. DRAKE
Per Andrew L. Chezem.
Attorney.

UNITED STATES PATENT OFFICE.

EDWIN Y. DRAKE, OF DAVENPORT, IOWA.

TOILET-BOWL CLEANER.

1,361,972.  Specification of Letters Patent.  Patented Dec. 14, 1920.

Application filed June 7, 1919. Serial No. 302,580.

*To all whom it may concern:*

Be it known that I, EDWIN Y. DRAKE, a citizen of the United States, residing at Davenport, in the county of Scott and State of Iowa, have invented a new and useful Toilet-Bowl Cleaner, of which the following is a specification.

My invention relates to improvements in toilet-bowl cleaners, in that it provides a means of completely closing the outlet hole or throat of a toilet-bowl during its operation of cleaning, and combines therewith, the elements of a force-pump, a suction-pump and means for directing the forced-jet, or stream of a city-water-system, undiminished, into a toilet-bowl and when the toilet-bowl is clogged by filth or foreign substance, of applying a proper and sufficient force directly to the object and of thus removing the same by either of the means indicated; thus applying to that purpose efficient and speedy means, at the same time lessening any liability of damages, or injury to surrounding property occasioned by the ordinary means of cleaning a clogged toilet-bowl.

I attain these objects by the mechanism illustrated in the accompanying drawing, in which—

Figure 1, is a sectional view of the assembled machine, disclosing its working mechanism.

Fig. 2, is a bottom end view of the same.

Fig. 3, is a side view of the device for securing the stopper-ball to the main pipe of the device.

Fig. 4, is a sectional view of the piston within the main pipe, and disclosing its attachment and packing arrangement.

Similar letters refer to similar parts throughout the several views.

The pipe 1, with cap 5, the piston-rod 2, handle 3, faucet 17, and faucet 21, brace-board 15, stopper-ball 12, ball-cap 13, nut 11, and piston-valve 6, constitute the general frame work and features of my machine.

In the construction, it is desired to have a section of metal-pipe 1, of suitable diameter provided with threads at its respective ends; those, at the top end, for attachment, of a cap, 5, which is an ordinary screw-threaded cap-nut threaded on the inner surface of its rim for securing to pipe 1, and having a hole 28, in its center to admit the insertion and snug movement of the piston-rod 2, through the same, when each are attached as shown in Fig. 1. Pipe 1, is provided at the bottom end preferably with an ordinary washer 10, and with threads upon which is attached nut 11, (but the nut 11 may be constructed with a plate-edge and the washer 10, eliminated). The washer 10 and nut 11, are attached by ordinary thread means to pipe 1, and in operation are found to fit within the bottom of stopper-ball 12, within a cavity 25, provided in the bottom side of stopper ball 12, being a milled enlargement of hole 24, through which pipe 1, is inserted, which stopper-ball 12, is constructed of soft or pliable rubber, and secured by nut means 11, to the bottom end of pipe 1, as disclosed in the drawings Figs. 1 and 2, and also secured against sliding upward thereon by the top plate shown as Fig. 3, which is a circular concave washer cast to fit the top of the stopper-ball 12, by means of a hole 27, in its center through which pipe 1, is passed, and when adjusted to stopper-ball 12, is securely fixed to the pipe 1, by set-screw 14, inserted through holes 14ª in the top band 13 thereof; 13ª representing the concave flange thereof, and when attached is used to prevent stopper-ball 12 from sliding upward on pipe 1, when in use.

12 represents a section view of a soft-rubber stopper-ball, having a hole 24, directly through its center of size suitable to snugly receive pipe 1, and secured thereto by nut 11, and concave washer Fig. 3. This rubber stopper-ball may be made of various sizes, which may be changed as needed to fit over the various outlet holes or apertures within the throat of any ordinary toilet-bowl, and having a milled cavity 25, at its lower end, larger but opening in connection with its center hole 24, for the purpose of admitting washer 10 and nut 11, when it is mounted on pipe 1, through the center-hole 24.

Stopper-ball 12 may be made of any soft rubber ball of sufficient size having a hole of proper dimensions through the center as indicated in Fig. 1, but it is required to be made of soft rubber so that in use when the stopper-ball 12 is inserted in the outlet hole of the toilet-bowl, upon pipe 1, and secured between washer 10 and nut 11, found at its bottom end and the circular concave washer Fig. 3, as shown in Fig. 1, upon its being pressed downward into the outlet hole or throat of the toilet-bowl by the device in the hands of the operator, it will fit snugly within any hole of smaller circumference than its own, thus preventing the escape of air or water, yet leaving the bottom aperture 26, of the pipe 1, open, so that the full force of the piston-valve 6, or the suction of the pump piston 2, may be obtained, and applied without waste or diminution, and when an ordinary water-hose is attached to the faucet 17 at 18, and the valve 6 is drawn upward to a point above faucet 17 at 20ª, and valve 19 is turned on so as to admit the stream of water from an attached hose, the force of the city-water-main or other artificial water-current-power will be applied directly to any object which may be obstructing the toilet-bowl. In such case valve 22 of faucet 21, is closed and valve 6, raised up snugly to the top of pipe 1, closing against cap 5, thus creating an air tight pipe 1, with its bottom end 26 furnishing its only aperture, and the stopper-ball 12 at the bottom end 26, closing the outlet of the toilet-bowl, thus leaving the force of the city-water-power through the attached hose in full effect, upon the obstruction which it is desired to remove.
Faucet 21, also serves as a drain when needed in operation and may be an ordinary faucet, with ordinary revolving or screw-valve 22, and mounted by screwing the same into pipe 1, at aperture 20, as shown in Fig. 1.

It is not deemed necessary to show shoulders for the threads necessary for the insertion of the faucets 17 and 21, about, apertures 20 in pipe 1, as it will readily be understood that shoulders would be a common means of providing thread surfaces in pipes for attaching faucets when it is desired to avoid obstructing the free upward and downward action or way of piston 6 within pipe 1, past their entrance.

Piston 6, when mounted on piston-rod 2 is operated within pipe 1 by means of handle 3 mounted on piston-rod 2 which handle 2 is secured thereto by nut-means 4.
Piston 6 is an ordinary thin circular valve of any desired material, of circumference suited to its being fitted within pipe 1, and is attached upon piston-rod 2 through hole 24, and secured thereto by means of nuts 7 and 8 and is made to fit snugly within pipe 1 by means of a rubber washer 9, encircling the piston 6 and secured thereupon in a groove in the edge thereof, substantially as shown in Figs. 1 and 4, for the purpose of procuring an air and water tight fit of the piston 6, within pipe 1.

In making use of this machine in a toilet-bowl, stopper-ball 12 at the bottom end thereof 25, is inserted in the outlet hole of such toilet-bowl; and when so inserted, baseboard 15 is extended cross-wise of the toilet-bowl, and is of sufficient length to reach across the same, and is mounted upon pipe 1, by hole 29 in its center, which center hole 29, has a raised portion 30 about it, raised flush to pipe 1, the raised portion 30, having in either side thereof, holes 16ª through which are inserted set-screws 16, for securing the same in desired position upon pipe 1.
When stopper-ball 12, is inserted in the outlet hole of toilet-bowl, the operator judges of the resiliency of stopper-ball 12 and gaging the brace-board 15 to the pressure necessary to close the outlet hole or throat of the toilet-bowl sets the set-screws 16 and steps upon the brace-board 15, thus by his weight forcing the stopper-ball 12 downward making pipe 1 air-tight, within such outlet hole or throat of the toilet-bowl, and resting the machine by brace-board 15, on the toilet-bowl, operates the piston 2 by handles 3, or raising the piston valve 6, to a point above faucet 17, operates the faucet 17 admitting water-pressure as desired, thus using air, water, man-power, water-pressure, or either or a combination thereof, as desired.

While I prefer the use of brace-board 15 in operating my machine yet it may be operated successfully without it, to suit different conditions, in such cases faucets 17 and 21 may be utilized as handles by which to force the machine down into the out-hole of a toilet-bowl while operating piston 2 or while utilizing the water-pressure through faucet 17.

Having fully described the construction of my invention and the manner of operating it,
I claim:
1. A rubber ball having centrally provided therein a hole suitable for the insertion of an initial pipe; a metal pipe having one end inserted through a rubber ball, one end of said pipe being provided with screw threads, screw nut means, embedded in the enlarged end of the central hole provided in a rubber ball mounted upon the end of a pipe by corresponding screw threads provided thereon therefor; concave convex washer means also provided on the said pipe upon the opposite side of said rubber ball arranged conformable to the shape of said rubber ball; set screw means within the top of said concave convex washer for securing it in contact with said rubber ball upon said pipe, all for the purposes specified.

2. In combination with a toilet bowl cleaner consisting of a pipe having an open end, its other end inclosed with a perforated cap, foot board means secured thereto for holding the same upon the top of a toilet bowl, a plurality of faucets; a handle attached to the end of a piston rod having its other end secured to a movable piston mounted within a pipe; a resilient rubber ball having a hole through its center, the hole having one of its ends chambered suitable for admission of nut means; said rubber ball mounted on the open end of said pipe and secured thereon between concave washer means, secured by set screw means on said pipe conformable to the top of said ball at its top, and a nut filled within the chambered end upon said pipe by same thread means, all for the purpose specified.

3. A resilient rubber ball having a hole through its center, one end of said hole being chambered suitable for the admission therein of a screw nut, mounted upon the end of a cylinder of a toilet bowl cleaner, secured thereto between a concave convex set screw washer at its top and a screw nut applied within the chamber of its center hole, at the bottom, capable of compression into the throat of a toilet bowl, for the purposes specified.

4. In a toilet bowl cleaner the combination of a resilient stopper ball having a hole through its center, such hole having a chambered end, mounted chambered end downward on the end of the pipe of a toilet bowl cleaner between nut and concave-convex washer means, the nut secured within such chambered end, upon one end of such pipe by screw thread means, the washer secured upon such pipe conformable to said ball by set screw means; a pipe having an open end supporting a stopper ball, its upper end inclosed with a cap having a center hole for the insertion of a piston rod, said pipe containing a piston mounted on the end of a piston rod, supporting a handle, the whole capable of vibrating the length of said pipe, the pipe also being provided with plural faucets arranged nearer the top than the bottom end, of said pipe, one above the other, suitable for intake and outlet of water; board means secured about said pipe by washer and set screw means, above the stopper ball, the whole capable of directing the stream force of a city water main into a toilet bowl and of adding thereto manpower pressure at the same time; holding the water within the throat of the toilet bowl and of letting the water escape from the machine without removing it from the toilet bowl, all substantially as described and for the purposes specified.

EDWIN Y. DRAKE.

Witnesses:
WM. E. ANDERSON,
JOHN N. SHALLEM.